United States Patent [19]

Taylor

[11] Patent Number: 4,487,425
[45] Date of Patent: Dec. 11, 1984

[54] BRAKE CONTROL SYSTEM FOR AN ARTICULATED VEHICLE

[75] Inventor: David J. Taylor, Pontiac, Mich.

[73] Assignee: General Motors Corporation, Detroit, Mich.

[21] Appl. No.: 447,314

[22] Filed: Dec. 6, 1982

[51] Int. Cl.³ .......................................... B62D 53/00
[52] U.S. Cl. ..................................... 280/432; 180/271
[58] Field of Search ............... 180/271, 282, 175, 275; 280/432, 446 B; 340/62, 70, 53, 52 F; 188/112 A, 112 R

[56] References Cited

U.S. PATENT DOCUMENTS

| 4,313,616 | 2/1982 | Howard | 280/432 |
| 4,403,674 | 9/1983 | Viall | 180/275 |
| 4,405,143 | 9/1983 | Rosenkrands | 280/432 |
| 4,405,145 | 9/1983 | Bergman | 280/432 |

OTHER PUBLICATIONS

Article "Articulated Scania Bus Built on the Standard BR112 Chassis", Bengt Palmér, 2/19/81

Primary Examiner—David M. Mitchell
Assistant Examiner—Joseph G. McCarthy
Attorney, Agent, or Firm—Edward J. Biskup

[57] ABSTRACT

A wheel brake control system for an articulated vehicle having fluid-operated actuators associated with the brake means at each wheel of the vehicle that are automatically supplied with pressurized fluid to cause the brake means to be applied for stopping the vehicle whenever the vehicle is moving in reverse at a predetermined speed or when the two hinged sections of the vehicle are displaced about a vertical axis at a predetermined angle while the vehicle is moving in reverse.

3 Claims, 1 Drawing Figure

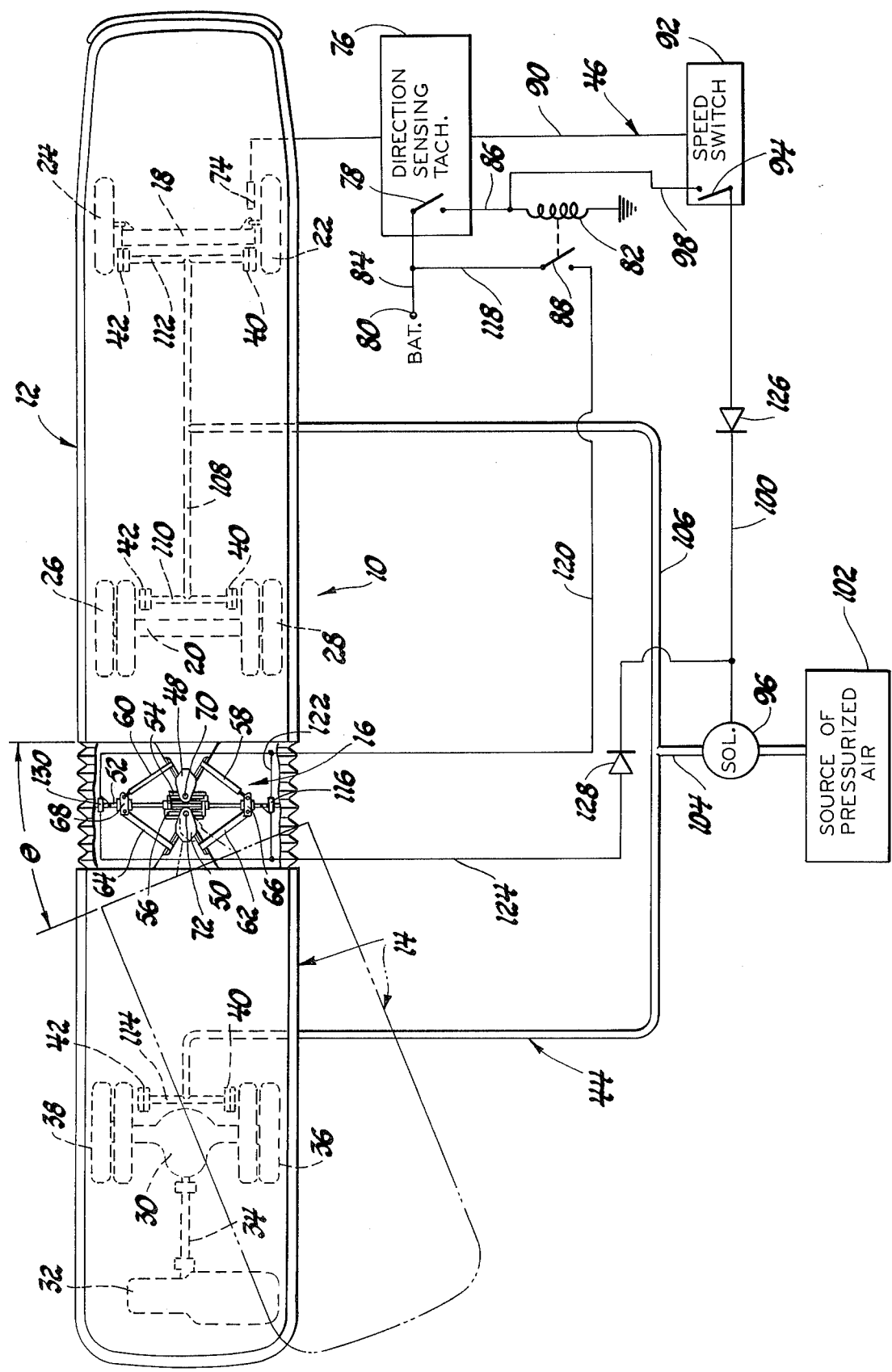

BRAKE CONTROL SYSTEM FOR AN ARTICULATED VEHICLE

This invention relates to articulated vehicles and more particularly concerns a brake control system for an articulated vehicle that serves to automatically apply the wheel brakes when the vehicle is moving in reverse and a predetermined speed is attained or when the front and rear sections of the vehicle are angularly displaced about a vertical axis at a predetermined angle.

More specifically, the present invention is incorporated in an articulated vehicle having a front section and a rear section interconnected by a hinge connection which allows relative angular displacement of the two sections about a vertical axis. The front section of the vehicle is provided with a pair of non-driven axles, one of which includes wheels which are fixed for straight-ahead rotation and the other of which is provided with dirigible wheels. The rear section has a driven axle which includes wheels fixed for straight-ahead rotation and the wheels of the pair of non-driven axles of the front section as well as the wheels of the driven axle of the rear section are provided with brake means. A fluid-operated actuator is connected to the brake means associated with each axle and causes the brake means to be applied to brake the associated wheels when connected with a source of pressurized fluid. A normally-closed solenoid valve is located between the source of pressurized fluid and the fluid-operated actuators and is controlled by an electric circuit which includes direction sensing means and speed responsive means which cause the solenoid valve to open and connect the source of pressurized fluid to the actuators when the vehicle is moving in reverse and attains a predetermined speed. In addition, the direction sensing means is operatively associated with switch means located at the hinge connection for causing the solenoid valve to open when the vehicle is moving in reverse and the rear section is angularly displaced relative to the front section at a predetermined angle.

The objects of the present invention are to provide a new and improved brake control system for an articulated vehicle that serves to automatically apply the wheel brakes when the vehicle is traveling in reverse and exceeds a predetermined speed or when the two sections of the vehicles are displaced relative to each other at a predetermined angle; to provide a new and improved brake control system for an articulated vehicle that is controlled by an electric circuit which includes means that sense the speed and direction of the vehicle as well as the angular displacement of the two sections of the vehicle about a vertical axis and, when the vehicle is traveling in reverse and exceeds a predetermined speed or when the angle between the two sections of the vehicle is equal to or exceeds a predetermined angle while traveling in reverse, automatically applies the wheel brakes to stop the vehicle; and to provide a new and improved wheel brake control system for an articulated vehicle having fluid-operated actuators associated with the brake means at each wheel of the vehicle that are automatically supplied with pressurized fluid to cause the brake means to be applied for stopping the vehicle whenever the vehicle is moving in reverse at a predetermined speed or when the two hinged sections of the vehicle are displaced about a vertical axis at a predetermined angle while the vehicle is moving in reverse.

Other objects and advantages of the present invention will be more apparent from the following detailed description when taken in conjunction with the accompanying drawing which shows an articulated vehicle having a brake control system made in accordance with the present invention.

Referring now to the drawing, an articulated vehicle or bus 10 is shown that includes a front section 12 and a rear section 14 interconnected by a hinge connection 16. The front section 12 of the bus 10 is provided with non-driven front and center axles 18 and 20, respectively, the former of which rotatably supports laterally spaced dirigible wheels 22 and 24 for allowing the bus 10 to negotiate turns as it is driven along the road. The center axle is provided with dual wheels 26 and 28 at the opposite ends thereof that are fixed for straight-ahead rotation. The rear section 14 is provided with a driven rear axle 30 which obtains power from an engine 32 through a suitable drive train which includes a drive shaft 34 and, as in the case with the center axle 20, the opposite ends of the driven rear axle 30 are provided with dual wheels 36 and 38 which also are fixed for straight-ahead rotation.

The axles 18, 20, and 30 of the bus 10 are each provided with a pair of air-operated actuators 40 and 42 which are connected to an air system 44 controlled by an electric circuit 46. The actuators 40 and 42, the air system 44 and the electric circuit 46 are all part of a brake control system made according to the invention which serves to apply the brakes (not shown) at each wheel and stop the bus 10 whenever the bus 10 is moving in reverse and exceeds a predetermined speed or if the angle between the front and rear sections 12 and 14 at the hinge connection 16 is equal to or greater than a predetermined angle and the bus 10 is traveling in reverse.

When the bus 10 is moving in the forward direction, the rear section 14 drives the front section 12 through the hinge section 16 which serves to maintain the two sections of the bus 10 in proper alignment during straight-ahead travel while allowing angular displacement between the two sections 12 and 14 when the bus 10 is in a turn and when traveling over crests and valleys. In this regard, it will be noted that the hinge connection 16 generally includes a pair of tongue members 48 and 50, a transversely extending pivot shaft member 52, a pair of trunnion members 54 and 56, and a control linkage which comprises link members 58, 60, 62, 64 and a pair of slider assemblies 66 and 68 slidably mounted on the pivot shaft member 52 for maintaining the pivot shaft member 52 properly positioned relative to the front and rear sections of the bus. The hinge connection 16 is identical in construction to the hinge connection disclosed in U.S. Pat. No. 4,405,143 issued on Sept. 20, 1983 in the name of JOHANNES W. ROSENKRANDS and entitled HINGE CONNECTION FOR ARTICULATED VEHICLES. and attention is directed thereto for a detailed description of the hinge connection, for present purposes, however, it will suffice to mention that each trunnion member 54 and 56 is connected to the pivot shaft member 52 for independent pivotal movement thereabout. In addition, the trunnion members 54 and 56 include vertically oriented pivot pins 70 and 72 which respectively interconnect the trunnion members 54 and 56 to the tongue members 48 and 50 for relative pivotal movement.

As to the two slider assemblies 66 and 68 of the control linkage, each is identical in construction and takes the form of a ring member adapted to slide along the pivot shaft member 52. Also the link members 58 and 60 are identical in construction and each has the opposite ends thereof connected by spherical connections to the tongue member 48 and one of the slider assemblies 66, 68. Likewise, the link members 62 and 64 are identical in construction and each has the opposite ends thereof connected by a vertically oriented pivotal connection to the tongue member 50 and one of the slider assemblies 66 and 68.

It should be apparent from the above that the front and rear sections 12 and 14 are capable of pivoting relative to each other in opposite directions about the vertical axes of the pivot pins 70 and 72 and are also capable of pivoting about the longitudinal center axis of the pivot shaft member 52. Accordingly, the hinge connection allows the bus 10 to negotiate turns and travel over crests and valleys in a road surface. In addition, the aforementioned control linkage insures that the longitudinal center axis of the pivot shaft member 52 is perpendicular to the longitudinal center axis of the bus 10 when traveling straight-ahead and always bisects the deflection angle between the front and rear sections 12 and 14 when the bus 10 is in a turn.

As is well known, if the two sections of an articulated vehicle, such as the bus 10, are not longitudinally aligned during reverse movement thereof, the angularity between the two sections tends to increase until the usual bump stops engage each other. If, however the bus operator should not realize that the bump stops have engaged and continues to power the vehicle in the reverse direction, the vehicle could experience some serious structural damage. The present invention, however, alleviates this problem by automatically applying the wheel brakes to stop the bus whenever it is being driven backward and the angle $\theta$ at the hinge connection 16, as seen in the drawing, is equal to or exceeds a predetermined angle such as 40 degrees. In addition, the present invention serves to apply the wheel brakes to stop the bus 10 when the bus is driven backward and exceeds a predetermined speed such as 3 M.P.H. irrespective of the angular displacement of the two sections 12 and 14.

In this regard, the electric circuit 46 includes a magnetic pickup 74 for continually sensing the R.P.M. of the front wheel 22 and providing a signal to a direction sensing tachometer 76. The magnetic pickup 74 generates a signal representing both wheel speed and direction of wheel rotation. The direction sensing tachometer 76, on the other hand, incorporates "reverse" relay logic which is energized only when the pickup 74 provides a signal indicating that the wheel 22 is rotating backwards. Dynalco Corporation, 5200 N.W. 37th Avenue, P.O. Box 8187, Fort Lauderdale, Fla., manufactures a pick up and direction sensing tachometer of the type incorporated in the electric circuit 46. The pickup is identified by Dynalco Corporation as Model M917 and the direction sensing tachometer is identified as Model DST2000.

Thus, when the bus 10 is moving forwardly, the "reverse" logic relay of the direction sensing tachometer 76 will be inactive, however, when the bus is moving in reverse, the "reverse" logic relay will be energized and the normally-open contacts 78 will be closed causing a battery 80 to energize a relay coil 82 via conductors 84 and 86, which in turn, results in a closing of the relay contacts 88. Simultaneously, the tachometer 76 will provide a signal via a conductor 90 to an electronic speed switch 92 which is designed to provide an output signal at a selected speed of the vehicle as sensed by the pickup 74. A speed switch of this type is also manufactured by the aforementioned Dynalco Corporation and is identified as Model SS240039, and in this instance, it can be assumed that the speed switch is set to provide an output signal at 3 M.P.H.

Therefore, when the bus 10 reaches a speed of 3 M.P.H. while moving in reverse, the "speed" relay logic of the speed switch 92 will cause the normally-open contacts 94 to be closed so as to connect the battery 80 to a normally-closed solenoid valve 96 via the conductor 84, through closed contacts 78 (bus 10 moving in reverse), conductors 86, 98, and 100. As a result a source of pressurized air 102 is connected via air lines 104, 106, 108, 110, and 112 to the air-operated actuators 40 and 42 associated with the front axle 18 and center axle 20 and is connected via air lines 104, 106 and 114 to the actuators 40 and 42 associated with the rear axle 30 causing all of the wheel brakes to be applied and the bus stopped.

If the bus 10 is being driven backwards at a speed less than 3 M.P.H., the "speed" relay logic will not be energized and therefore the speed switch 92 will, of course, not generate an output signal and the bus 10 may travel in reverse. However, under such conditions, if the rear section 14 should move angularly about the pivot pin 72 to the phantom line position, the rear section 14 will be displaced at an angle $\theta$ which, as aforementioned, is equal to 40 degrees. During the time that the rear section 14 moves towards the phantom line position and the bus 10 is traveling backwards, the "reverse" relay logic of the tachometer 76 will close contacts 78 to energize the relay coil 82 which will close the contacts 88. At the same time the control linkage incorporated with the hinge connection 16 will cause the slider assembly 68 to move inwardly along the pivot shaft member 52 towards the trunnion members 54 and 56 while the slider assembly 66 will move outwardly along the pivot shaft member 52 away from the trunnion members 54 and 56. When the rear section 14 reaches the phantom line position, the slider assembly 66 will close a limit switch 116 supported by the pivot shaft member 52. Closing of the limit switch 116 permits the battery 80 to be connected to the normally-closed solenoid valve 96 via the conductors 84, 118, closed contacts 88, conductors 120, 122, closed contacts of the limit switch 116, and the conductors 124 and 100. The diodes 126 and 128 in conductors 100 and 124, respectively, provide isolation between the two circuits that energize the solenoid valve 96. As a result, the solenoid valve 96 opens and the source of pressurized air 102 is connected to the air-operated actuators 40 and 42 associated with each of the axles 18, 20, and 30 for applying the wheel brakes and stopping the bus 10. As should be apparent if the bus is traveling backwards and the rear section 14 moves in a counterclockwise direction about the pivot pin 72 from the full line position as seen in the drawing, the slider assembly 68 will close a limit switch 130 mounted on the pivot shaft member 52 when the rear section 14 reaches the phantom line position. It will be noted that the limit switch 130 is electrically in parallel with the limit switch 116 and, accordingly, closing of the limit switch 130 will cause the solenoid valve 96 to open and the wheel brakes to be applied to stop the bus 10.

As should be apparent, various changes and modifications can be made in the above described brake control system without departing from the spirit of the invention. Such changes and modifications are contemplated by the inventor, and therefore, he does not wish to be limited except by the scope of the appended claims.

The embodiments of the invention in which an exclusive property or privilege is claimed are defined as follows:

1. In an articulated vehicle having a front section and a rear section interconnected by a hinge connection which allows relative angular displacement of said front and rear sections about a vertical axis, one of said sections having a pair of axles and the other of said sections being provided with a single axle, each of said axles having wheels at the opposite ends thereof provided with brake means, fluid-operated actuator means carried by each axle for causing said brake means to be applied to brake the associated wheels and stop the vehicle when supplied with pressurized fluid, a source of pressurized fluid, a normally-closed valve located between said source of pressurized fluid and said fluid-operated actuator means of at least one of said axles, a control circuit including direction sensing means and speed responsive means for causing said valve to open and connect said source of pressurized fluid to said fluid-operated actuator means when said vehicle is moving in reverse and attains a predetermined speed, and means operatively associated with said direction sensing means and located at said hinge connection for causing said valve to open when the vehicle is moving in reverse and said rear section is angularly displaced relative to the front section at a predetermined angle.

2. In an articulated vehicle having a front section and a rear section interconnected by a hinge connection which allows relative angular displacement of said front and rear sections about a vertical axis, one of said sections having a pair of axles and the other of said sections being provided with a single axle, each of said axles having wheels at the opposite ends thereof provided with brake means, fluid-operated actuator means carried by each of the axles for causing said brake means to be applied to brake the associated wheels and stop the vehicle when supplied with pressurized fluid, a source of pressurized fluid, a normally-closed valve located between said source of pressurized fluid and said fluid-operated actuator means, an electric circuit including direction sensing means and speed responsive means for causing said valve to open and connect said source of pressurized fluid with said fluid-operated actuator means when said vehicle is moving in reverse and attains a predetermined speed, and switch means operatively associated with said direction sensing means and located at said hinge connection for causing said valve to open when the vehicle is moving in reverse and said rear section is angularly displaced relative to the front section at a predetermined angle.

3. In an articulated vehicle having a front section and a rear section interconnected by a hinge connection which allows relative angular displacement of said front and rear sections about a vertical axis, said front sections having a pair of nondriven axles one of which is provided with wheels fixed for straight-ahead rotation and the other of which is provided with dirigible wheels, said rear section being provided with a driven axle having wheels fixed for straight-ahead rotation, said wheels of said pair of nondriven axles of said front section and said wheels of the driven axle of said rear section each being provided with brake means, fluid-operated actuator means carried by each of the axles for causing said brake means to be applied to brake the associated wheels and stop the vehicle when supplied with pressurized fluid, a source of pressurized fluid, a normally-closed solenoid valve located between said source of pressurized fluid and said fluid-operated actuator means, an electric circuit including direction sensing means and speed responsive means for causing said solenoid valve to open and connect said source of pressurized fluid to said fluid-operated actuator means when said vehicle is moving in reverse and attains a predetermined speed, and switch means operatively associated with said direction sensing means and located at said hinge connection for causing said solenoid valve to open when the vehicle is moving in reverse and said rear section is angularly displaced relative to the front section at a predetermined angle.

* * * * *